Nov. 26, 1935.     R. T. DEANE     2,022,340
BRAKE TESTING MACHINE
Filed May 28, 1930     4 Sheets-Sheet 1
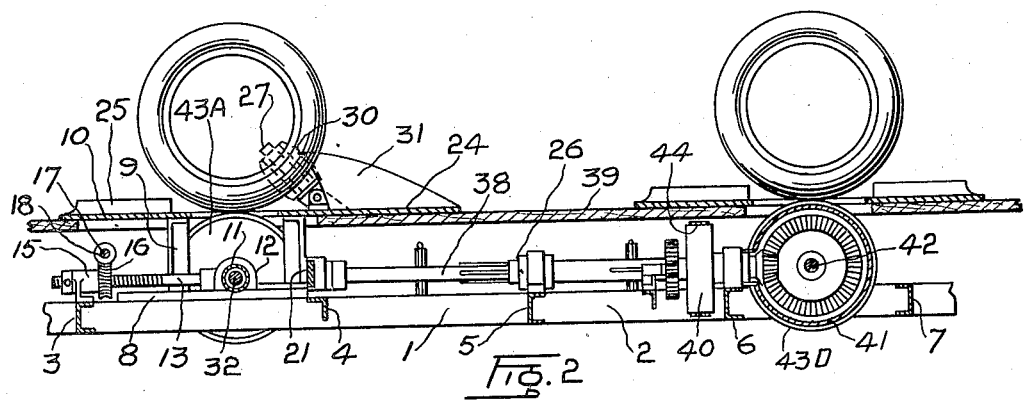
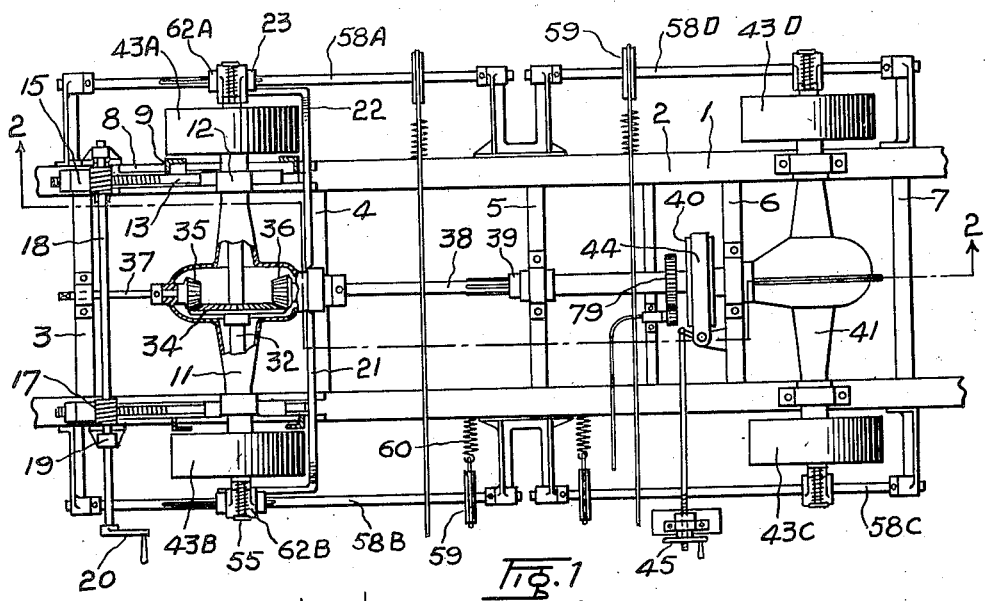
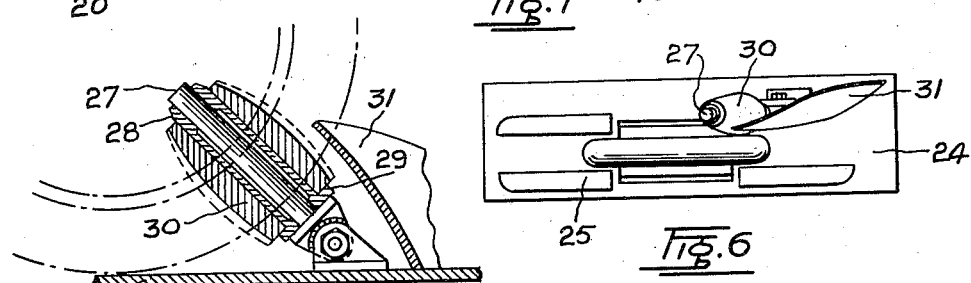
INVENTOR
RICHARD TEESDALE DEANE
BY Fetherstonhaugh & Co
ATTORNEYS Nov. 26, 1935.  R. T. DEANE  2,022,340
BRAKE TESTING MACHINE
Filed May 28, 1930  4 Sheets-Sheet 4
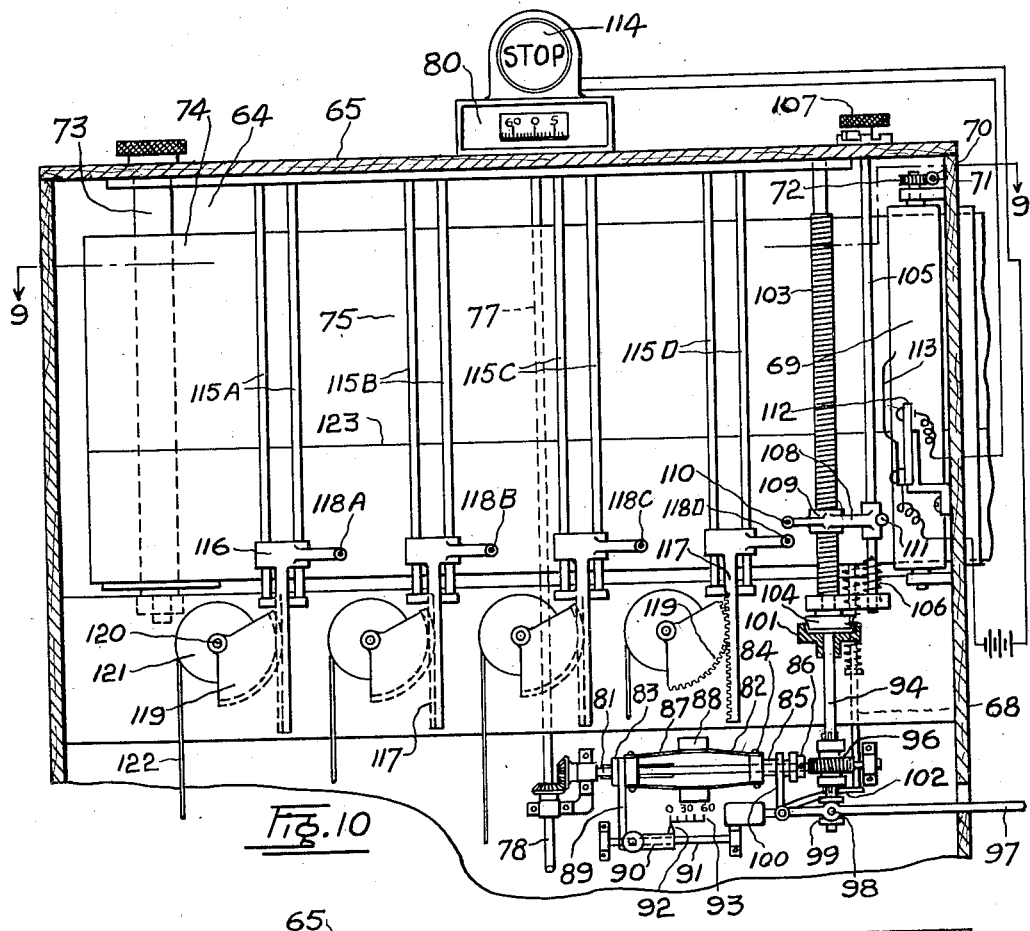
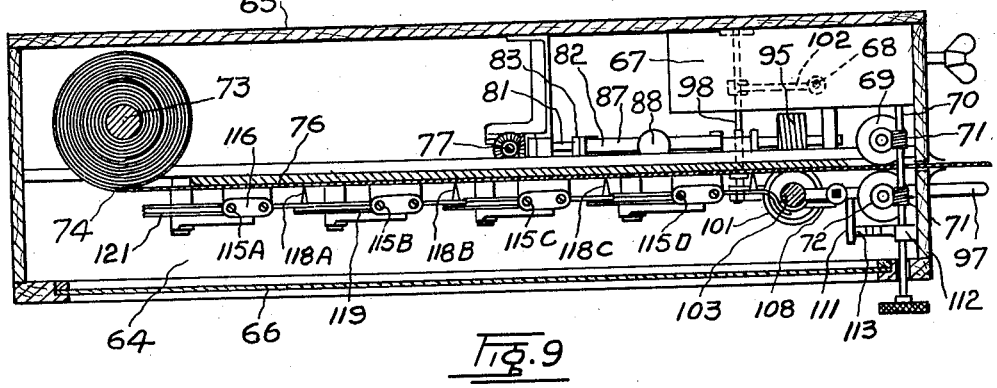
INVENTOR
RICHARD TEESDALE DEANE
BY
*Fetherstonhaugh & Co*
ATTORNEYS Patented Nov. 26, 1935

2,022,340

UNITED STATES PATENT OFFICE 2,022,340

BRAKE TESTING MACHINE

Richard Teesdale Deane, Riondel, British Columbia, Canada

Application May 28, 1930, Serial No. 456,561

8 Claims. (Cl. 265—25)

My invention relates to improvements in brake testing machines which are particularly adapted for testing the brakes of the several wheels of a motor car under similar conditions to those prevailing when driving on a paved highway.

The particular objects of the invention are to provide means for testing the relative holding power of each brake simultaneously; the time taken and distance travelled in bringing a car to rest after signalling to the driver to apply his brakes; to test the reaction of the driver to the signal to stop, whereby the lapsed time between the signal and the driver's application of the brakes, and the distance the car would have travelled during the lapsed period is determined; to test the speed of deceleration of the car and to show any defects in any of the brakes, such as jerky action, intensive grip at first application or just prior to its wheels coming to rest, also to automatically produce a record on a single chart wherein all the above effects are accurately inscribed. A further and extremely important object is to provide means whereby all the above data is recorded in a few moments so that a number of cars can be tested expeditiously. A further object is to provide hand operated means for testing the relative effort required to impart rotation to each of the wheels against the holding power of the several brakes, whereby a comparison may be made for primary adjustment if desired.

The invention consists essentially of a plurality of drums which are adapted to support a motor car and be driven thereby and means associated with said drums for recording simultaneously the numerous effects of the several brakes of the car and the reactions of the driver to a traffic signal, as will be more fully described in the following specification and shown in the accompanying drawings.

Fig. 1 is a plan view of the brake testing device with the deck removed.

Fig. 2 is a sectional view taken on the line 2—2 of Figure 1.

Fig. 5 is a detail view of a wheel guide and roller.

Fig. 6 is a plan view of same.

Fig. 9 is a plan view of the recording instrument taken on the line 9—9 of Figure 8.

Fig. 10 is a front view of the recording instrument with the front removed.

In the drawings like characters of reference indicate corresponding parts in each figure.

Figures 3, 4:
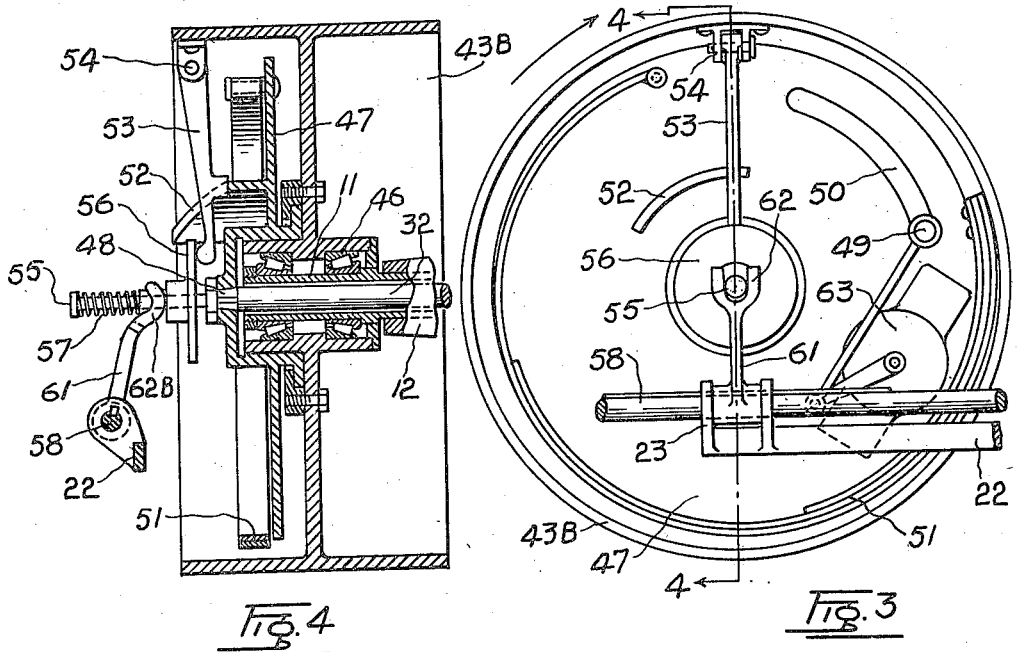
Fig. 3 is a side view of one of the wheel supporting drums.
Fig. 4 is a sectional view of same taken on the line 4—4 of Figure 3.
Figure 11:
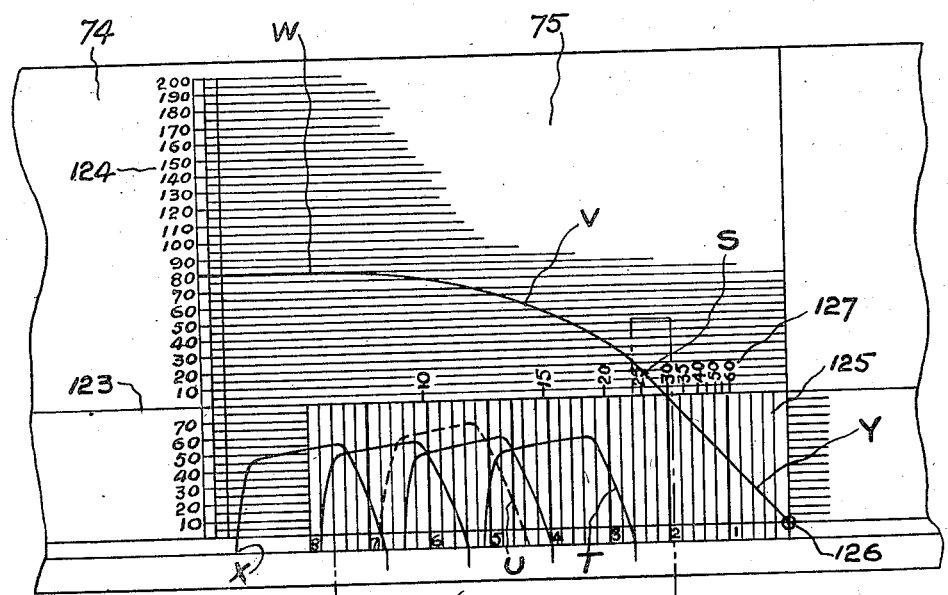
Fig. 11 is a view of a completed record.
Figure 7:
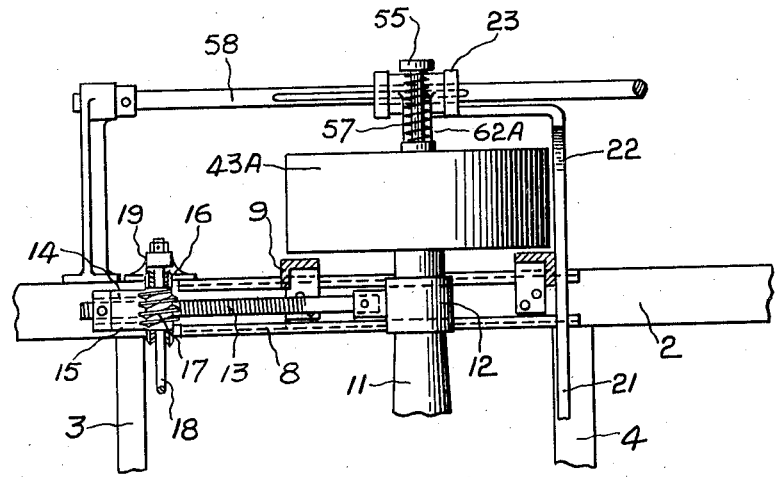
Fig. 7 is a detail plan view showing the manner of adjusting the machine to varying lengths of wheel base.
Figure 8:
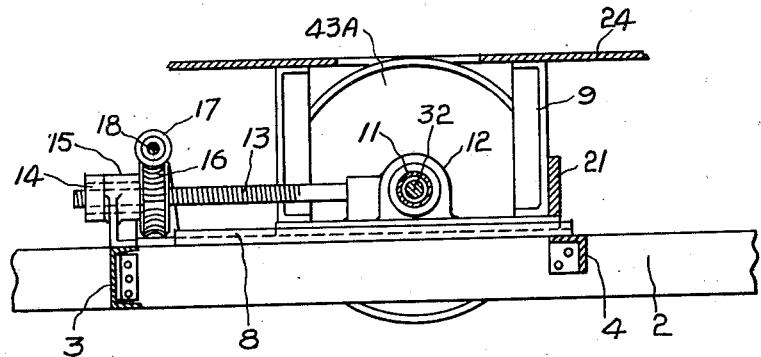
Fig. 8 is a side elevation.

The numeral 1 indicates generally a frame consisting of longitudinal members 2, and transverse members 3, 4, 5, 6 and 7. A pair of slides 8 are mounted upon the members 2 which support pairs of uprights 9 and apertured plates 10. The slides also support an axle housing 11 which is held at each end in a block 12 (see detail views 7 and 8). Each block 12 is fitted with a non-rotatable screw 13, which is fitted in a threaded sleeve 14 journalled in a bearing 15, the sleeve is held against endwise movement within its bearing and is fitted with a worm wheel 16.

The worm wheels 16 are engaged by worms 17 fitted upon a transverse shaft 18 which is journalled in bearings 19 mounted upon the members 2 and is fitted at its outer end with a hand crank 20 so that the axle housing 11 and its associated parts may be moved transversely along the members 2 as desired by turning the crank 20.

Extending parallel to the axle housing 11 is a bar 21 which is secured thereto intermediate its length to form a support for the longitudinal shaft to be hereinafter described, and which is bent adjacent its ends as at 22 and provided with pairs of spaced eyes 23, the purpose of which will hereinafter appear.

Fitted upon the uprights 9 is a pair of apertured plates 24 (see detail in Figure 6), each of which are provided with pairs of inclined plates 25 which serve to direct the front wheels of a car to be tested into proper position upon the deck 26 of the machine. A shaft 27 is pivotally mounted on each of the plates 24 and which is adapted to be inclined towards the centre of the front wheel of the car and is fitted with a freely rotatable sleeve 28 having a flange 29 at its lower end. The sleeve is adapted to be detachably fitted with one of a plurality of interchangeable rollers 30 each of a different diameter. The shafts 27 are preferably disposed outside the tread of a car to be tested and to be fitted when testing a car with small diameter tires with large rollers 30 and conversely when testing a car with large tires small diameter rollers would be fitted, so that the periphery of the rollers would be in light engagement with the side walls of the tires behind the axle and thereby prevent the wheels being moved out of alignment with the car chassis by the steering wheel.

Fitted to the plate 24 in substantial alignment with the shaft 27 is an inclined guide 31 somewhat in the form of a plough share which serves to direct the front wheels of the car into position for testing. The axle housing 11 encloses a pair of connected axles 32 driven by a crown gear 34 and a pair of pinions 35 and 36, the former being fitted to a short shaft 37 journalled upon the transverse member 3 and squared at its outer end to accommodate a hand crank or other suitable drive, not shown, while the latter is fitted to a splined shaft 38 having intermediate its length a telescopic connection 39. The rear end of the shaft 38 is fitted with a flywheel 40 and is connected through a housing 41 similar to the housing 11, and through pinion, crown gear and to a further pair of axles 42. The axles 32 and 42 are each coupled indirectly with drums or pulleys generally indicated by the numeral 43 and lettered A, B, C and D respectively, the upper face of said drums projects slightly above the level of the deck 26 and are adapted to support the wheels of a car during testing. By virtue of the gear ratio between the drums 43 and the flywheel 40 the kinetic energy stored in the flywheel when driven through the drums by an average weight car at a given drum speed will be similar to that of the car when travelling at the same speed upon a road and in consequence the same braking effort would be required to stop the car when on the road, or to bring the drums and its flywheel to rest.

In order to obviate difficulty in driving a car into position with its wheels upon the drums, a band brake 44 operable by a hand wheel 45 is fitted to the flywheel, thus permitting the longitudinal shaft 38 to be held against rotation and since opposite car wheels will engage opposite drums simultaneously the said drums are also held at rest, so that the car can be driven and held in position thereon pending the fastening of the car against endwise movement for testing purposes under its own power. The drums 43 are freely mounted in bearings 46 upon the outer ends of the axle housings 11 and 41 and rockingly mounted upon the hub of each of said drums in a disc 47 (see details in Figures 3 and 4) the discs being directly secured as at 48 to the end of the axles 32 or 42. The web of each drum carries a projecting stop or pin 49 which projects through an arcuate slot 50 in the disc. A spring 51 of suitable tension is anchored between the drum and the disc 47 which tends to hold the drum, as shown in Figure 3, against anticlockwise movement with respect to the disc. Each disc 47 is provided with a segmental face cam 52 which is normally engaged at its point of least projection with a lever 53 hingedly connected to the drum adjacent its periphery as at 54.

Secured to the end of the axle 32 is an extension shaft 55 upon which is rotatably and slidably mounted a flange 56, which flange is urged into engagement with the free end of the lever 53 by a compression spring 57.

Rockingly mounted outside the drums 43 are four longitudinally arranged shafts 58A, B, C and D, each having a fixed sheave 59 which is urged in one direction with a spring 60. An arm 61 is fitted upon each shaft 58 and is forked at its free end as at 62 to engage the flange 56 of its corresponding drum 43. The forks 62A and 62B are slidably mounted upon their shafts and are moved therealong by the spaced eyes 23 at the extremities of the bar 21, so that when the axle housing 11 is moved longitudinally of the frame 1 the forks 62A and 62B move with it.

The drive as between the drums 43 and the disc 47 under certain circumstances is communicated through the springs 51 as will be hereinafter described, which will deflect the springs according to the strains put upon them and obviously as the drive is discontinued the deflected springs will tend to return to normal position or contour with extreme rapidity and produce shock, but this is overcome by mounting a dash pot 63 of any suitable type on each disc 47, which is operatively connected to the outer end of its stop 49.

A recorder generally indicated by the numeral 64 is mounted in any suitable position, preferably to the left front of the car under test. This recorder consists of a casing 65 having a viewing opening 66 and enclosing a clock 67 which is adapted to be started in response to the raising of a rod 68 (shown in dotted line in Figure 9). The clock 67 drives a pair of vertical rollers 69 through a shaft 70 having a right and left worm 71 and a pair of worm wheels 72 upon the shafts. A demountable vertical spool 73 is provided at one end of the casing which is adapted to receive a record strip 74, having vertical perforations or markings to divide it into separate record charts 75.

A panel 76 extends between the spool 73 and the rollers 69 which serves to form a backing for the record strip 74, so that the several records may be inscribed thereon. Mounted at the rear of the panel is a vertical shaft 77 which is driven by a flexible shaft 78 through gears 79 from the longitudinal shaft 38 (see Figure 1) and connected at the upper end of the shaft 77 is a speedometer 80 which indicates to the driver of the car under test the peripheral speed in miles per hour of his car wheels. From the vertical shaft 77 a horizontal splined shaft 81 is driven which is fitted with a flyball governor generally indicated by the numeral 82. The governor consists of a grooved collar 83 and a collar 84 having a sleeve 85 projecting outwards, which is provided with a flange 86. The collars 83 and 84 are slidably mounted upon the shaft 81 and are connected together with a plurality of springs 87 fitted intermediate their length with flyballs 88. The collar 83 is adjustably held in any desired position by a fork 89 slidably carried by a sleeve 90 upon a horizontal rod 91, the outer end of the sleeve being provided with a pointer 92 which is adapted to indicate miles per hour upon a graduated scale 93. The shaft 81 drives a vertical splined shaft 94 through a worm 95 and worm wheel 96, which splined shaft is adapted to slide vertically through the worm wheel in response to a hand lever 97 which projects through the end of the casing 65 and is mounted upon a horizontal shaft 98, an intermediate portion of said lever being connected to a trunnioned collar 99 upon the vertical shaft 94. The hand lever 97 is lightly held against movement by frictional engagement with the casing wall through which it passes, or by any other suitable means, so that the splined shaft 94 will remain in raised position until reset.

Fitted upon the horizontal shaft 98 is a forked arm 100 which is adapted to be engaged by the flange 86 on the collar 84, when a predetermined road wheel speed is attained, to rock the shaft 98 and through the lever 97 raise the vertical shaft 94. The vertical shaft 94 is fitted at its upper end with a clutch member 101. Fitted upon the shaft 98 is an arm 102 which is adapted to engage and lift the vertical rod 68 to set the clock 67 in motion and start the record strip 74 to transverse the panel 76. Mounted in alignment above the vertical shaft 94 is a threaded shaft 103 having a clutch cone 104 at its base which is adapted to be engaged and driven by the clutch member 101 as the shaft 94 is raised, and parallel to this shaft is a square rod 105 which is spring tensioned as at 106 to urge it in a clockwise direction (as seen in Figure 9). The rod 105 is fitted with a thumb nut 107 at its upper end by which it can be turned against the action of the spring and is fitted with a sliding arm 108 having intermediate its length a threaded half nut 109, a stylus 110 at its outer end, and a forwardly projecting finger 111 at its inner end.

Mounted adjacent the threaded shaft 103 is a switch 112 having a spring contact 113 of substantial length, which is adapted to be engaged by the finger 111 to hold the switch in closed position during its travel therealong. The switch 112 is included in a circuit with a stop light or other suitable signal 114 which is placed in a convenient viewing position to the driver. Mounted in front of the panel 76 and the record strip 74 is a plurality of vertical guides 115A, B, C and D, along which crossheads 116 mounted upon vertical racks 117 are adapted to be moved and carried by each crosshead is a pencil indicated respectively by the numerals 118A, B, C and D.

Each rack is engaged by a gear segment 119 upon a shaft 120 which shaft is suitably spring tensioned to urge it in a clockwise direction and is fitted with a sheave 121. A cable 122 is secured to each sheave 121 and extends to its corresponding sheave 59 upon the horizontal shafts 58, so that as any of these shafts are rotated in response to the outward movement of the forked arm 61 the cable is wound upon the sheave 59 and off the sheave 121 and the pencil 118 is moved upwards across the moving record chart 75.

Having thus described the several parts of my invention I will now briefly explain its operation.

A car to be tested is run onto the deck and held in position with its rear wheels upon the periphery of the drums 43C and 43D and is held against endwise movement by stop blocks (not shown) applied against the front and rear bumpers or by any other suitable means. If the wheelbase of the car differs from that of the machine, the crank 20 is turned to move the axle housing 11 and its drums 43A, and 43B into position under the front wheels. If the car brakes are considered to be badly out of adjustment, a preliminary test is made by applying brakes, and rotating the shaft 37 to impart rotation to the axles 32 and 42 in a clockwise direction (as seen in Figures 1 and 3), thus imparting rotation to each of the discs 47 to deflect the springs 51 against the resistance imposed by the brakes through the car wheels to the drums 43. When sufficient rotational force has been applied to the discs to overcome the resistance imposed on its respective drum by a wheel brake, the position of the corresponding pencil 118 is noted, and when slip occurs on all of the brakes the position of the pencils will indicate the relative power of each of the brakes to hold its wheel against rotation.

This test is of a comparative value only for general adjustment and does not give proper indication of the holding power of the brakes in bringing the wheels to rest.

In the regular test the energy required is produced by the car itself. The car clutch is let in and the road wheels brought up to any desired speed. The drive from the rear wheels of the car is transmitted to the drums 43C and 43D and through the stops 49 to their discs 47, which in turn impart rotation to the axles 42, the horizontal shaft 38 and through the axles 32 their discs 47. The rotation of these discs imparts rotation to their drums through the springs and to the front wheel of the car, so that both front and rear wheels of the car rotate at similar peripheral speed. The brake test can be taken and recorded in two different ways, viz: automatically as a predetermined speed is reached and/or in response to a hand operated signal and subsequent to a relative distance of travel. In the former case we will assume that the record is to be taken at a speed of 30 M. P. H. The pointer 92 on the sleeve 90 controlling the setting of the governor 82 is set to 30 on the graduated scale 93 and the spring tensioned arm 108 is withdrawn from the threaded vertical shaft 103 and raised until the stylus 110 is level with a brake line 123 on the record chart 75, when the arm is replaced with its half nut 109 in engagement with the shaft. The driver increases his speed whilst watching the stop or signal light 114. When a peripheral wheel speed of 30 M. P. H. is attained the governor flyballs 88 driven by the flexible shaft 78 fly out by centrifugal force and move the collar 84 and its flange 86 to the left until it engages the forked arm 100, rocks the shaft 98 and raises the lever and the arm 102 to engage the clutch members, setting the vertical threaded shaft in rotation and starting the clock.

As these events take place, the record chart starts moving to the right at a constant speed and the stylus 110 moves vertically upwards producing on the chart a line S tangential to the brake line 123. Simultaneous with the upward movement of the stylus above this line 123, the finger 111 presses the spring contact 113 of the switch 112 to close the electrical circuit and illuminate the stop signal 114. The driver on seeing the stop signal illuminated applies his brakes to bring the wheels to rest, but obviously a period of time will elapse between the illumination of the signal and the application of the brakes and consequently the line inscribed on the chart during this period will be straight and tangential to the brake line, the vertical distance covered by the stylus on this portion of the line will represent the distance that the car would have travelled according to the distance scale 124 during the driver's reaction to the signal and the horizontal distance covered upon the chart will represent the time taken for the driver to respond to the signal. As soon as the rotation of the road wheels is impeded through the application of the brakes the momentum of the flywheel 40 and its associated parts will cause the discs 47 on the axles 32 and 42 to overrun the drums 43A, 43B, 43C and 43D to deflect their springs 51 and through their cams 52 rock the shafts 58C and 58D thus causing the pencils, 118C and 118D to inscribe tangential lines T on the base of the chart. If all the brakes are so adjusted as to impede the rotation of all wheels simultaneously the initial upstroke of each of the lines will be equidistantly spaced as can be readily determined by applying a scale Z which is preferably in the form of a square.

Should one of the brakes be applied later than the others due to faulty connections or otherwise, the line inscribed through the action of the wheel affected will be to the left of its proper position, as might be indicated in dotted line as at U, in which case the distance to the left of the correct graduation on the scale Z would represent the time interval that that particular brake lagged in initial application behind the others. As deceleration of the road wheels takes place corresponding deceleration of the vertical shaft 103 will ensue and the upwards movement of the stylus 110 will follow, thus with the constant movement of the chart to the right a curve V will be inscribed which will terminate in a horizontal line W as all the wheels are brought to rest. As the wheels come to rest the springs 51 connecting the drums 43 and the discs 47 will retract to their normal positions, thus altering the position of the cams 52 with respect to the arms 53, causing the longitudinal shafts 58 to rock in an opposite direction and through the cables 122 restore the pencils 118 to the base of the chart, completing the graph of each brake action as at X. The horizontal length of the curve V will show the time taken in seconds to bring the wheels to rest from the moment of applying the brakes.

Since the position of the stylus 110 is vertically above the pencil 118D it obviously follows that the point of application of the brakes will be represented as at the junction of the tangential line S and the curve V and will be vertically above the initial upward movement of the pencil 118D. The horizontal projection of the tangential line S will show the interval in seconds between the illumination of the signal and the driver's response in applying the brakes.

The horizontal projection of the tangential line S and the curve V will show the time taken in seconds to bring the wheels to rest from the moment of illuminating the signal. The point at which the line W intersects the scale 124 will show the number of feet that the wheels would have travelled before being brought to rest.

The vertical projection of the tangential line S will show the distance in feet that the wheels of the car would have travelled in the interval between the illumination of the stop signal and the application of the brakes.

If a driver desires to have a test made at his average speed of travel, the governor control fork 89 is moved to the right so that its pointer 92 is beyond his speed range and he brings his car wheels up to the speed required. In this test the stylus 119 is lowered to engage the chart at the point indicated by the numeral 126. When he has his wheels rotating at a substantially constant speed the lever 97 is raised to set the clock 67 and the stylus 110 in motion, the combined movement of the chart and the stylus causes a tangential line Y to be inscribed from the point 126 and when the stylus intersects the brake line the signal light is illuminated and all other events take place as previously described. The right end of the brake line is graduated as at 127 in miles per hour so that the point where the line Y intersects the brake line 123 will record the miles per hour of the road wheels at the commencement of the test.

It will thus be seen that I have invented a brake testing and recording machine which will be of extreme value in controlling motor vehicles, to make driving safe and to prevent accidents, and also to provide an infallible test as to the sobriety or otherwise of a driver in case of need by recording the time taken for him to respond with his brakes to an emergency signal.

What I claim as my invention is:

1. In a brake testing machine having a plurality of drums upon which the wheels of a motor car are adapted to be supported and to be driven thereby, a deck surrounding the upper periphery of the drums along which the car is adapted to be driven, a pair of rollers mounted upon the deck adjacent two of the drums adapted to hold the front wheels of the car in alignment with the drums upon which they are carried, each of said rollers being rotatable about a shaft and said shaft being pivotally mounted upon a transverse pin parallel to and to one side of the axis of the drum whereby the angle of the roller shaft above the horizontal can be varied.

2. In a brake testing machine having a plurality of drums upon which the wheels of a motor car are adapted to be supported and to be driven thereby, a deck surrounding the upper periphery of the drums along which the car is adapted to be driven, a pair of rollers mounted upon the deck adjacent two of the drums adapted to hold the front wheels of the car in alignment with the drums upon which they are carried, each of said rollers comprising a sleeve rotatably mounted upon an inclined shaft and a demountable hollow body concentrically carried by the sleeve.

3. In a brake testing device, a plurality of drums adapted to support the wheels of a car and be driven thereby, said drums being connected together by means including transverse axles and a longitudinal shaft, a time operated chart, a stylus movable across the chart, means operable in response to the rotation of the longitudinal shaft for moving the stylus, a governor driven by said stylus operating means and a stop signal actuated by the stylus when the governor obtains a selected speed.

4. In a brake testing device, a plurality of drums adapted to support the wheels of a car and be driven thereby, means connecting the drums for substantially simultaneous rotation, a time chart, a stylus movable across said chart, means operated by the drum connecting means for moving the stylus across the chart at a speed proportionate to the peripheral speed of said drums, a circuit including a stop light closable in response to the movement of the stylus and the attainment of a predetermined peripheral speed of the drums.

5. In a brake testing device having a longitudinal shaft fitted with a flywheel, a pair of transverse axles, means operatively connecting said longitudinal shaft and transverse axles, drums rotatable about said axles, a resilient connection between each drum and its axle, each of said drums being adapted to support a wheel of a motor car, the above means operating to transmit the drive from the rear wheels of the car through the drums and their axles to the front wheels, the resilient connection including a member secured to each axle adjacent the drum, a stop carried by the drum normally engaging the member and a spring anchored to the member and the drum tending to hold the stop in engagement with the member against the holding power of the car wheel brakes, said member being adapted to be moved in advance of the drum by kinetic energy from the flywheel as a brake is applied and the spring tensioned, and means for registering the tension of the spring during the movement of the member in advance of the stop.

6. A motor vehicle brake testing machine comprising fixed and movable carriages, a driving element connecting the carriages, said carriages adapted for rotation by the motor vehicle drive mechanism and motor, an auxiliary brake cooperating with the driving element connecting the carriages for resisting said rotation, said auxiliary brake being adapted to maintain a constant torque and speed of said motor during release of the motor vehicle brake.

7. A motor vehicle brake testing machine comprising two fixed and two movable wheel supporting carriages, a drive shaft connecting the carriages, said fixed carriages adapted for rotation by the motor vehicle drive wheels and motor, an adjustable auxiliary brake associated with the driving shaft to maintain a constant load and speed on said motor, and indicating means to measure the brake resistance of said auxiliary brake.

8. A motor vehicle brake testing machine comprising a plurality of endless wheel supporting means adapted to rotatably support and be driven by the vehicle drive wheels, means connecting said supporting means so that said supporting means may be driven in unison by the motor vehicle whereby upon the application of the vehicle brakes with a predetermined force the speed of the wheel supporting means will be varied, a brake operatively associated with said connecting means adapted when applied to maintain the supporting means at the same speed as prevailed upon the application of the vehicle brakes and means associated with each wheel support to measure the braking force exerted by the brake upon the vehicle wheels.

RICHARD TEESDALE DEANE.